(12) United States Patent
Ieda et al.

(10) Patent No.: US 8,383,720 B2
(45) Date of Patent: Feb. 26, 2013

(54) THERMOPLASTIC COMPOSITION

(75) Inventors: Shinji Ieda, Tokyo (JP); Hiroharu Itaya, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 12/999,936

(22) PCT Filed: Jun. 19, 2008

(86) PCT No.: PCT/JP2008/061265
§ 371 (c)(1),
(2), (4) Date: Dec. 17, 2010

(87) PCT Pub. No.: WO2009/153878
PCT Pub. Date: Dec. 23, 2009

(65) Prior Publication Data
US 2011/0112237 A1 May 12, 2011

(51) Int. Cl.
*C08L 67/00* (2006.01)
*C09B 67/00* (2006.01)
(52) U.S. Cl. ........................ 524/513; 524/502
(58) Field of Classification Search .................. 524/513
See application file for complete search history.

(56) References Cited

U.S. PATENT DOCUMENTS 6,689,838 B1  2/2004  Fischer et al.
2006/0030659 A1 *  2/2006  DeStio .......................... 524/494

FOREIGN PATENT DOCUMENTS

| JP | 6-41393 A | 2/1994 |
| JP | 7-173363 A | 7/1995 |
| JP | 07173363 A * | 7/1995 |
| JP | 7-228741 A | 8/1995 |
| JP | 11-100516 A | 4/1999 |
| JP | 3098308 B | 10/2000 |
| JP | 2001234043 A * | 8/2001 |
| JP | 2002-138177 A | 5/2002 |
| JP | 2003-20389 A | 1/2003 |
| JP | 2003-26905 A | 1/2003 |
| JP | 2003-503574 A | 1/2003 |
| JP | 2003020389 A * | 1/2003 |
| JP | 3327652 B2 | 9/2004 |
| JP | 2004-277451 A | 10/2004 |
| JP | 2004-285108 A | 10/2004 |
| JP | 2004-323635 A | 11/2004 |
| JP | 2006-257158 A | 9/2006 |
| JP | 2008-156507 A | 7/2008 |
| JP | 2008-156508 A | 7/2008 |

OTHER PUBLICATIONS

Translation of JP 2003-020389, Jan. 2003.*
Translation of JP 07-173363, Jul. 1995.*
International Preliminary Report on Patentability for International Patent Application No. PCT/JP2008/061265, mailed on Feb. 17, 2011.
International Search Report for PCT/JP2008/061265, mailed Aug. 26, 2008.
Database WPI, Week 199712, AN 1997-128948, XP-002669697, JP-9-12849-A (Jan. 14, 1997), Thomson Scientific, London, Great Britain.
Database WPI, Week 200171, AN 2001-613869, XP-002669698, JP-2001-234043-A (Aug. 28, 2001), Thomson Scientific, London, Great Britain.
Office Action for corresponding European Patent Application No. 08765760.7, dated Mar. 15, 2012.
Supplementary Search Report for corresponding European Patent Application No. 08765760.7, dated Mar. 2, 2012.
Office Action for corresponding Chinese Patent Application No. 200880129878.6, dated Apr. 16, 2012.

* cited by examiner

*Primary Examiner* — Hui Chin
(74) *Attorney, Agent, or Firm* — Birch, Stewart, Kolasch & Birch, LLP

(57) ABSTRACT

A thermoplastic resin composition comprising: 20 to 60 parts by mass of a styrene-based resin (A) in which a content of an unsaturated nitrile-based monomer is from 32 to 50 mass %; 20 to 60 parts by mass of an aromatic polyester (B) in which an isothermal crystallization time from the molten state is from 25 to 100 sec; and 20 to 60 parts by mass of a filler (C).

2 Claims, No Drawings

THERMOPLASTIC COMPOSITION

TECHNICAL FIELD

The present invention relates to a thermoplastic resin composition having an excellent balance of heat resistance, appearance, low warpage, and scratch resistance, which has not been attained in the conventional technology.

BACKGROUND ART

Aromatic polyesters represented by polyethylene terephthalate (PET) and polybutylene terephthalate (PBT) have excellent mechanical properties, chemical resistance, and electrical characteristics. Furthermore, reinforcement with a filler can impart the rigidity and heat resistance to the aromatic polyesters. Such aromatic polyesters are used in a wide range of fields such as automobiles, home appliances and OA. However, filler-reinforced polyesters have drawbacks that a product appearance is impaired when an additive amount of the filler increases, and warpage generates easily when an additive amount of the filler is small, and scratch resistance is low when the polyesters are used as the parts which need appearance.

As a means to improve appearance and warpage of a molding, a method of blending a polyethylene terephthalate with a composition that contains a filler-reinforced polybutylene terephthalate and a styrene-based resin (Refer to patent document 1), and a composition that contains a filler reinforced-polytrimethylene terephthalate and a thermoplastic composition (Refer to patent document 2) have been reported.

It has been well-known that the composition composed of these aromatic polyesters and styrene-based resin varies greatly in the physical properties depending on the compatibility, the viscosity and the volume ratio. Among them, especially the compatibility largely effects a change in the physical properties. However, a styrene-based resin, which has been used heretofore in the composition with an aromatic polyester and contains 20-30 mass % of an unsaturated nitrile-based monomer, whose compatibility with aromatic polyesters is relatively high, has the problems of lowering the degree of crystallinity of polyesters, lowering the heat resistance, and the like.

As a composition to solve the above problems, a resin composition comprising an aromatic polyester and two kinds of styrene-based resins, in which a ratio of an unsaturated nitrile-based monomer is from 10 to 50 mass % and the ratio is different, has been reported. The composition composed of these components shows imperfect crystallinity, therefore, an adhesion reducing agent is blended, and thus, the deposition due to the adhesion reducing agent can be decreased by extremely reducing the blending amount, and shortening of the molding cycle is enabled.
Patent document 1: JP-B-3098308
Patent document 2: JP-A-2003-20389
Patent document 3: JP-A-2003-503574

DISCLOSURE OF THE INVENTION

Problem to be Solved by the Invention

By the way, at present, the resin composition has been requested, which shows enhancement in not only productivity by shortening the molding cycle but also improvement in appearance, low warpage, and scratch resistance. And, the thermoplastic resin composition has been required, which shows the moderate control of the crystallinity even in the case of blending too much styrene-based resin, and has an excellent balance of heat resistance, appearance, low warpage, and scratch resistance.

Taking the above-mentioned circumstances into consideration, a problem that the present invention intends to solve is to provide a thermoplastic resin composition which has an excellent balance of heat resistance, appearance, low warpage, and scratch resistance.

Means for Solving the Problem

The present inventors have studied intensively to solve the above problem, and have found that a thermoplastic resin composition having an excellent balance of heat resistance, appearance, low warpage, and scratch resistance can be obtained by blending in a specific ratio, a styrene-based resin containing an unsaturated nitrile-based monomer in a ratio of from 32 to 50 mass % and a filler, into an aromatic polyester in which an isothermal crystallization time from a molten state is from 25 to 100 sec, and have accomplished the present invention.

That is, the present invention is as follows:
[1]
A thermoplastic resin composition comprising:
20 to 60 parts by mass of a styrene-based resin (A) in which a content of an unsaturated nitrile-based monomer is from 32 to 50 mass %;
20 to 60 parts by mass of an aromatic polyester (B) in which an isothermal crystallization time from the molten state is from 25 to 100 sec; and
20 to 60 parts by mass of a filler (C).
[2]
The thermoplastic resin composition according to the above item [1], wherein the aromatic polyester (B) is polytrimethylene terephathalate alone, or a polyester mixture comprising 50 mass % or more of polytrimethylene terephthalate.
[3]
The thermoplastic resin composition according to the above items [1] or [2], wherein the styrene-based resin (A) is a styrene-acrylonitrile copolymer.

Advantages of the Invention

According to the present invention, a thermoplastic resin composition having an excellent balance of heat resistance, appearance, low warpage and scratch resistance can be provided.

The thermoplastic resin composition of the present invention has an excellent balance of heat resistance, appearance, low warpage, and scratch resistance, therefore, according to the present invention, in a wide range of fields such as automobile parts, home appliances and OA, paintless which was difficult in the conventional technology can be achieved.

BEST MODE FOR CARRYING OUT THE INVENTION

The best mode for carrying the present invention (hereinafter, the present embodiment) will be described in more detail. It should be noted that, the present invention is not limited to the following embodiment, and thus various modifications can be carried out within the scope of the gist.

The thermoplastic resin composition of the present embodiment comprises 20 to 60 parts by mass of a styrene-based resin (A) containing an unsaturated nitrile-based monomer in a ratio of from 32 to 50 mass %, 20 to 60 parts by mass of an aromatic polyester (B) in which an isothermal crystallization time from a molten state is from 25 to 100 sec and 20 to 60 parts by mass of a filler (C).

[Component (A): Styrene-Based Resin]

The styrene-based resin (A) used in the present embodiment is a copolymer which copolymerized at least an unsaturated nitrile-based monomer and an aromatic vinyl-based monomer, and if necessary other copolymerizable monomers. In general, these styrene-based resins (A) can be produced by emulsion polymerization, bulk polymerization, or bulk-suspension polymerization, and the production method of the resin (A) is not limited to these polymerization methods.

Examples of the unsaturated nitrile-based monomer used for styrene-based resin (A) include, but are not limited to, acrylonitrile, methacrylonitrile, and ethacrylonitril, and the like. Among these, acrylonitrile is preferable. These can be used in one kind or two kinds or more.

Examples of the aromatic vinyl-based monomer include, but are not limited to, styrene, α-methyl styrene, o-methyl styrene, p-methyl styrene, o-ethyl styrene, p-ethyl styrene, and p-t-butyl styrene and the like. Among these, styrene and α-methyl styrene are preferable. These can be used in one kind or two kinds or more.

Examples of the other copolymerizable monomers include an alkyl ester compound of acrylic acid and methacrylic acid such as butyl acrylate, ethyl acrylate, methyl methacrylate; N-phenyl maleimide; maleic anhydride, and the like. These can be used in one kind or two kinds or more.

Among these, styrene-acrylonitrile copolymer (AS resin), which is obtained by using acrylonitrile as the unsaturated nitrile-based monomer, and styrene as the aromatic vinyl-based monomer and containing 15 mass % or less of other copolymerizable monomers, is preferable.

In styrene-based resin (A), the ratio of the unsaturated nitrile-based monomer is from 32 to 50 mass %, preferably from 34 to 45 mass %, more preferably from 37 to 42 mass %. From the viewpoint of enhancement of scratch resistance of the resin composition, the ratio is 32 mass % or more, and from the viewpoint of suppressing the decrease in thermal stability, the ratio is 50 mass % or less. In addition, from the viewpoint of enhancement of heat resistance, the ratio is preferably 37 mass % or more, and from the viewpoint of enhancement of productivity, the ratio is 42 mass % or less.

Here, the ratio of the unsaturated nitrile-based monomer in the styrene-based resin (A) means the ratio of the acetone-soluble component of the styrene-based resin (A). The ratio of the acetone-soluble component can be obtained by the following procedure; 20 mL of acetone is added to 1 g of sample, and the mixture is shaken by a shaking apparatus until the soluble component completely dissolves, and only the soluble component is filtered by centrifuging for 40 minutes under 20000 rpm, and then dried for 4 hr at 80° C. to eliminate acetone, and further dried for 1 hr at 100° C. under reduced pressure. The ratio of unsaturated nitrile-based monomer can be obtained by measuring the IR of the soluble component and using a calibration curve.

The styrene-based resin (A) may comprise a rubbery polymer in the range where the scratch resistance is not impaired severely, and a resin obtained by grafting an unsaturated nitrile-based monomer and an aromatic vinyl-based monomer to the rubbery polymer, and further a resin obtained by copolymerizing other copolymerizable monomer are included in the styrene resin (A). Examples of the unsaturated nitrile-based monomer, aromatic vinyl-based monomer, and other copolymerizable monomer, which are used, include the same type monomer as mentioned above.

Examples of the rubbery polymers, which are used for styrene-based resin (A), include, but are not limited to, a diene-based elastomer, acrylic elastomer, and ethylenic elastomer, and the like. Specific examples of these rubbery polymers include polybutadiene, styrene-butadiene copolymer, styrene-butadiene block copolymer, acrylonitrile-butadiene copolymer, butyl acrylate-butadiene copolymer, polyisoprene, butadiene-methyl methacrylate copolymer, butyl acrylate-methyl methacrylate copolymer, butadiene-ethyl acrylate copolymer, ethylene-propylene copolymer, ethylene-propylene-diene-based copolymer, ethylene-isopropylene copolymer, and ethylene-methyl acrylate, and the like. Among these rubbery polymers, acrylic rubber is preferably used.

A mass average particle diameter of the rubbery polymer is preferably from 0.1 to 0.5 μm. From the viewpoint of improvement in impact resistance, the mass average particle diameter is preferably 0.1 μm or more, and from the viewpoint of prevention of deterioration of appearance of the molding, it is preferably 0.5 μm or less. From the viewpoint of preventing a decrease in scratch resistance, a content of the rubbery polymer is preferably 15 mass % or less based on the whole resin composition, and more preferably 10 mass % or less.

In addition, styrene-acrylonitrile-butadiene copolymer (ABS resin), obtained by grafting acrylonitrile as the unsaturated nitrile-based monomer and styrene as the aromatic vinyl-based monomer to a diene-based elastomer, and a resin (ASA resin) obtained by grafting acrylonitrile as the unsaturated nitrile-based monomer and styrene as the aromatic vinyl-based monomer to an acrylic rubber, can be preferably used.

A weight average molecular weight of the styrene-based resin (A) is preferably from 30,000 to 500,000, more preferably from 50,000 to 300,000. From the viewpoint of mechanical strength, it is 30,000 or more, and from the viewpoint of productivity, it is 500,000 or less. Here, the weight average molecular weight is defined as the following value; acetone is used as solvent, and an acetone-soluble part is separated and dried; this is dissolved in tetrahydrofuran, and a gel permeation chromatography (GPC) of CO-8011 (trade name) produced by Tosoh Corporation is used; and a column of TSKgelG3000HXL, TSKgelG4000HXL, TSKgel5000HXL, TSKgel6000HXL (trade name) produced by Tosoh Corporation is used at 38° C.; and the value is measured by polystyrene conversion using a TSK standard polystyrene (grade number 05215) produced by Tosoh Corporation.

[Component (B): Aromatic Polyester]

Examples of the aromatic polyester (B) in the present embodiment include, but are not limited to, any known aromatic polyester. The production of the aromatic polyester, for example, can be carried out by known method of reaction of terephthalic acid, an ester thereof, or an ester-forming derivative thereof with 1,4-butanediol, 1,3-propanediol, or 1,2-ethanediol.

The aromatic polyester (B) may comprise other copolymerizable components. Examples of such other copolymerizable components include an ester forming monomer such as 1,2-butanediol, 1,3-butanediol, neopentyl glycol, 1,6-hexamethylene glycol, 1,4-cyclohexanediol, 1,4-cyclohexane dimethanol, ethylene oxide adduct of bisphenol A, isophthalic acid, succinic acid, adipic acid, sebacic acid, dodecane diacid, fumaric acid, maleic acid, or 1,4-cyclohexane dicarboxylic acid. A ratio of copolymerization of the above compound, but are not limited to if it is a range where the purpose of this invention is not impaired, usually is preferably 30 mol % or less of the acid component (terephthalic acid, an ester thereof, or other ester-forming derivative thereof), or 30 mol % or less of the glycol component (1,4-butanediol, 1,3-propanediol, or 1,2-ethanediol).

As a rate of crystallization of the aromatic polyester, the isothermal crystallization time from the molten state is from 25 to 100 sec, preferably from 25 to 70 sec, and more preferably from 30 to 60 sec. From the viewpoint of improving an appearance, it is 25 sec or more, and from the viewpoint of preventing a decrease in moldability, it is 100 sec or less.

The isothermal crystallization time of the aromatic polyester can be measured using a differential scanning calorimeter (DSC) by the following method. Using a differential scanning calorimeter, 5 mg of a sample is melted by heating from 30 to 270° C. at a temperature elevation rate of 100° C./min. After holding for 3 min at 270° C., the sample is quickly cooled to 140° C. at a set temperature lowering rate of 500° C./min, and then the isothermal crystallization time is measured. Here, the isothermal crystallization time is defined as a time until a crystallization peak at 140° C. appears after holding for 3 min at 270° C. Thus, it is possible to judge that, the shorter the isothermal crystallization time is, the higher the rate of crystallization is.

By using two kinds or more aromatic polyesters, the isothermal crystallization time can be controlled within the above range. For example, in the case of using polybutylene terephthalate (PBT), which has a high rate of crystallization, it is preferable to use it together with polyethylene terephthalate (PET), which has a low rate of crystallization. Here, in the case of using two kinds or more aromatic polyesters together, an ester exchange reaction occurs, and the degree of crystallization may decrease. Thus, in the case of using polytrimethylene terephthalate (PTT), which has a moderate rate of crystallization, PTT alone is preferably used, or in the case of using another aromatic polyester together, PTT is preferably used as a main component, and thus, a thermoplastic resin composition with a high hardness having an excellent properties of appearance, scratch resistance and low warpage tends to be obtained.

As for a weight average molecular weight of the aromatic polyester (B), but are not limited to, an intrinsic viscosity (dl/g) measured at 35° C. using an o-chlorophenol solution, is preferably in the range from 0.4 to 3.0, more preferably from 0.5 to 2.5. From the viewpoint of mechanical strength, it is 0.4 or more, and from the viewpoint of productivity, it is 3.0 or less.

Further, in the aromatic polyester (B), a crystal nucleating agent may be mixed to increase the rate of crystallization. The known compounds generally used as crystal nucleating agents for aromatic polyesters can be used. Preferable examples of the crystal nucleating agent include talc, mica, boron nitride, kaolin, silica, clay, metallic oxides, inorganic carboxylates, inorganic sulfonates, organic carboxylates, organic sulfonates, organic carboxylic acid ester salts, carbonates, ionic copolymers composed of α-olefin and α,β-unsaturated carboxylate, and the like. Among these, a fatty acid metal salt represented in the following general formula (1), is preferably used.

$$CH_3(CH_2)_nCOO(M) \quad (1)$$

(wherein, $n \geq 0$, M=Na, Ca, and Li)

Among these fatty acid metal salts, a higher fatty acid Na salt, a higher fatty acid Ca salt, and a higher fatty acid Li salt are more preferable. These crystal nucleating agents may be used alone, or in a mixture of two kinds or more.

As for an amount to be added of the crystal nucleating agent, there is no special limitation, if the isothermal crystallization time is in the range of the present embodiment, and it can be selected appropriately considering the kind of crystal nucleating agent used, a combination thereof, and the performance thereof.

[Component (C)]

Examples of the filler (C) used in the present embodiment include, but are not limited to, glass fiber, carbon fiber, metal fiber, aramid fiber, potassium titanate whisker, aluminum borate whisker, wollastonite, talc, calcium carbonate, kaolin, mica, glass flakes, glass bead, titanium oxide, and aluminum oxide, and the like. Among these, the fiber-like filler is preferable, and the chopped strand-type glass fiber is more preferable.

Among the above, for example, some of the talc, kaolin, mica, and glass fibers and the like may have the characteristics to act as a crystal nucleating agent, depending on the kind used. In addition, as for these fillers, the especially surface-treated fillers are suitably used. As the surface treatment, it is carried out using a coupling agent and a film-forming agent. Examples of the coupling agent include an epoxy-based coupling agent, a silane-based coupling agent, and a titanium-based coupling agent, and the like. Especially, in the case of mixing the fiber-like filler, although there are no special limitations for a mean fiber length, an average fiber diameter and an aspect ratio of the fiber, from the viewpoint of mechanical properties and fatigue properties, the mean fiber length is preferably 50 μm or more, more preferably 100 μm or more, and still more preferably 150 μm or more. Moreover, it is preferable that the average fiber diameter is 5 μm or more, and it is preferable that the aspect ratio is 10 or more.

The resin composition in the present embodiment is the thermoplastic composition comprising 20 to 60 parts by mass of the styrene-based resin (A), 20 to 60 parts by mass of the aromatic polyester (B), and 20 to 60 parts by mass of the filler (C), as above-mentioned. The content of the styrene-based resin (A) is from 20 to 60 parts by mass based on 100 parts by mass of the resin composition, and preferably is from 25 to 45 parts by mass. When the content of the styrene-based resin (A) is 20 parts by mass or more, scratch resistance and low warpage tend to be improved, and when the content is 60 parts by mass or less, a decrease in heat resistance tends to be suppressed. From the viewpoint of obtaining a resin composition having an excellent balance of heat resistance, low warpage and good scratch resistance, the content of the aromatic polyester (B) is from 20 to 60 parts by mass based on 100 resin composition parts by mass and is preferably from 25 to 50 parts by mass. From the viewpoint of heat resistance, it is 20 parts by mass or more, and from the viewpoint of dimensional stability, it is 60 parts by mass or less. The content of the filler (C) is from 20 to 60 parts by mass and preferably is from 25 to 35 parts by mass. When the content of the filler (C) is 20 parts by mass or more, scratch resistance tends to be improved, and when it is 60 parts by mass or less, the decrease in moldability and appearance tend to be suppressed.

It is preferable that the styrene-based resin (A) and the aromatic polyester (B) used in the present embodiment, have a difference in melt viscosities of both at a kneading temperature, and it is more preferable to satisfy the following condition, when each MFR at 240° C. and load of 5 kg are represented with MFR-A and MFR-B, respectively.

$$3 \leq MFR\text{-}B/MFR\text{-}A \leq 10$$

When the ratio of MFR-B to MFR-A is smaller than 3, a deterioration of heat resistance tends to occur, and when the ratio of MFR-B to MFR-A exceeds 10, moldability is bad because the compatibilization of the styrene-based resin (A) and the aromatic polyester (B) does not proceed, and physical properties have a tendency to decrease. For a molding obtained from the resin composition in the present embodiment to have the excellent heat resistance, it is preferable that the styrene-based resin (A) in the resin composition exists as a dispersed phase or co-continuous phase in the aromatic polyester (B) as continuous phase.

Further, in addition to the above components, various additives generally used for thermoplastic resin compositions can be blended to the thermoplastic resin composition in the present embodiment. In order to improve the flame retardancy, examples of such an additive include a halogen-containing compound such as a halogenated polycarbonate oligomer (for example, a polycarbonate oligomer which was produced from brominated bisphenol A as the raw material) and a halogenated epoxide compound, and the like; a phosphorus-nitrogen compound such as red phosphorus, a phosphorus compound, and a phosphonic acid amide; a supplemental flame retardant auxiliary (for example, antimony trioxide), and the like. Additionally, examples of the other additive include an ultraviolet absorber and an antioxidant such as phosphite-based, hindered phenol-based, benzotriazole-based, benzophenone-based, benzoate-based, and cyanoacrylate-based; lubricant and plasticizer such as a higher fatty acid, acid ester-based, acid amide-based, and higher alcohol; a mold lubricant such as montanic acid and a salt thereof, an ester thereof, a half-ester thereof, stearyl alcohol, stearamide and ethylene wax; an anti-coloring agent such as phosphite and hypophosphite, and the like; a nucleating agent; antistatic agents such as amine-based, sulfonic acid-based, and polyether-based; colorants such as pigment and dyestuff.

The thermoplastic resin composition in the present embodiment is obtained by blending/mixing each component as above-mentioned in appropriate proportions and by kneading. Examples of the equipment for blending various components include Henschel Mixer, Ribbon Blender, and a drum tumbler, and the like. In addition, examples of an apparatus for kneading include a single screw extruder, a twin screw extruder, a continuous kneader having a twin-rotor, a multi-screw extruder, an open-roller, and a Banbury mixer, and the like.

The thermoplastic resin composition in the present embodiment can be molded by a well-known method. Although it is molded with the molding methods of injection molding, extrusion molding, blow molding, compression molding, transfer molding, and calendar molding, and the like, among them, injection molding is suitably used. In injection molding, there are the applied technologies such as insert molding, gas-assist injection molding, and injection compression molding, and they are suitably used.

For the scratch resistance of the molding obtained by molding the resin composition in the present embodiment, a pencil scratch value (JIS K5600) used for the surface hardness test of a coating is assumed to be an index, and it is preferable that the scratch value thereof is 2H or more. Scratch value of 2H shows the hardness that a scratch mark does not remain, even if the surface of the molding is scratched with a pencil having a hardness of 2H. When used for an external material in many fields such as automobiles and home appliances and OA, there is a problem that a scratch is generated, the design properties decrease, therefore, it is desirable to have a surface hardness of 2H or more. In addition, when a surface hardness of 2H or more is obtained, a secondary treatment such as painting or hard coating become unnecessary, therefore, an advantage such as shortening the production cycle and reduction of environmental impact by VOC reduction, arises.

The thermoplastic resin composition in the present embodiment has an excellent balance of heat resistance, appearance, scratch resistance and low warpage, therefore, paintless can be attained in many fields such as automobile parts and home appliances/OA, which have been difficult to achieve by the conventional technology.

EXAMPLES

The present embodiment will be described below in more detail with examples, however, the present embodiment should not be limited by the following examples.
(1) Raw Materials Used for the Example and Comparative Example.
Each raw material used was as follows.
<Styrene-Based Resin (A)>
(A-1) AS resin composed of 40 mass % of acrylonitrile and 60 mass % of styrene and having a number average molecular weight of 57,000: (produced by Asahi Kasei Chemicals Corp.).
(A-2) AS resin composed of 20 mass % of acrylonitrile and 80 mass % of styrene and having a number average molecular weight of 71,000 (produced by Asahi Kasei Chemicals Corp.).
(A-3) ASA resin composed of 50 mass % of acrylic rubber having a mass average particle diameter of 0.3 μm, 15 mass % of acrylonitrile, and 35 mass % of styrene.
(A-4) AS resin composed of 34 mass % of acrylonitrile and 66 mass % of styrene and having a number average molecular weight of 6,700 (produced by Asahi Kasei Chemicals Corp.).
(A-5) AS resin composed of 30 mass % of acrylonitrile and 70 mass % of styrene and having a number average molecular weight of 5,500 (produced by Asahi Kasei Chemicals Corp.).
<Aromatic Polyester (B)>
(B-1) PBT having isothermal crystallization time of 20 sec: Duranex 2002 (produced by Polyplastics Co., Ltd.).
(B-2) PTT having isothermal crystallization time of 50 sec and a number average molecular weight of 9,800: CP-502901 (produced by Shell Corp.).
(B-3) PET: NEH-2050 (produced by Unitika Ltd.).
<Filler (C)>
(C-1) Glass fiber (GF) surface-treated with an epoxy-based coupling agent and having an average fiber diameter of 10 μm: FT792 (produced by Owens Corning Japan Ltd.).
(C-2) Wollastonite surface-treated with an epoxy-based coupling agent, and having average fiber diameter of 8 μm: NYG-LOS8 (produced by Hayashi Kasei Co., Ltd.).
(2) Preparation and Evaluation Method of Molding
The molding was prepared with an injection molding machine. Each test piece was prepared at 250° C. in cylinder preset temperature and at 95° C. in mold temperature using an injection molding machine J-100EPI manufactured by The Japan Steel Works and an injection molding machine SG100 manufactured by Sumitomo Heavy Industries and evaluated.

The evaluation and the measuring method of various physical properties in the example and the comparative example were as follows.
[Heat Distortion Temperature (HDT)]
Each distortion temperature in load 1.8 MPa was measured according to ISO-75-1,2. Unit: ° C.
[Pencil Hardness]
It was carried out according to JIS K5600.
[Warpage]
A flat plate having 100 mm×100 mm×2 mm was molded with an injection molding machine, and one point of the corner was pressed, and a floating height at a corner on diagonal to the pressed point was assumed to be the warpage amount. Unit: mm.

[Appearance]

A flat plate having 100 mm×100 mm×2 mm was molded with an injection molding machine, and as for the surface appearance, Gs (60° C.) was measured according to JISK7150 using a digital variable angle glossmeter manufactured by Suga Test Instruments Co., Ltd. When a measured value was 80 or more, appearance was indicated as ⊚, in the case of from 60 to 80, it was indicated as ○, and in the case of less than 60, it was indicated as x.

machine SG100 manufactured by Sumitomo Heavy Industries, respectively, and each properties was evaluated. Table 1 shows the evaluation results.

The isothermal crystallization time of the mixture of PBT and PET used in example 1 was 30 sec, the isothermal crystallization time of the mixture of PBT and PET used in comparative example 6 was 28 sec, the content of the unsaturated nitrile-based monomer in the styrene-based resin used in example 3 was 38.3 mass %, and the content of the unsaturated nitrile-based monomer in the styrene-based resin used in comparative example 6 was 22.3 mass %.

TABLE 1

| | (A) Styrene-based resin [parts by mass] | | | (B) Aromatic polyester [parts by mass] | | | (C) Filler [parts by mass] | | HDT | Pencil | | Warpage |
|---|---|---|---|---|---|---|---|---|---|---|---|---|
| | A-1 | A-2 | A-3 | B-1 | B-2 | B-3 | C-1 | C-2 | [° C.] | hardness | Appearance | [mm] |
| Example 1 | 35 | | | 30 | | 5 | 30 | | 155 | 3H | ○ | 1 |
| Example 2 | 35 | | | | 35 | | 30 | | 155 | 3H | ⊚ | 1 |
| Example 3 | 25 | | 10 | | 35 | | 30 | | 155 | 2H | ⊚ | 1 |
| Example 4 | 25 | | | | 45 | | 30 | | 185 | 3H | ⊚ | 3 |
| Example 5 | 35 | | | | 35 | | 20 | 10 | 145 | 3H | ⊚ | 1 |
| Comparative Example 1 | 70 | | | | | | 30 | | 110 | 3H | X | 1 |
| Comparative Example 2 | | | | 70 | | | 30 | | 210 | H | X | 8 |
| Comparative Example 3 | | | | | 70 | | 30 | | 210 | H | ○ | 8 |
| Comparative Example 4 | 35 | | | 35 | | | 30 | | 155 | 3H | X | 1 |
| Comparative Example 5 | | 35 | | | 35 | | 30 | | 120 | 2H | ⊚ | 1 |
| Comparative Example 6 | | 25 | 15 | 40 | | 5 | 15 | | 155 | HB | ⊚ | 1 |
| Comparative Example 7 | 10 | | | | 60 | | 30 | | 210 | H | ○ | 5 |
| Comparative Example 8 | 70 | | | | 15 | | 15 | | 110 | H | X | 1 |

Examples 1 to 5 and Comparative Examples 1 to 8

For the above each component, (A) component and (B) component were dry-blended in the blending ratio shown in Table 1 and melt-kneaded at 240° C. using a twin screw extruder PCM45 (L/D=28.9) manufactured by Ikegai Corp. Filler (C) was added from a side feeder.

Using the resultant pellet, an ISO dumbbell test piece and flat plate of 100 mm×100 mm×2 mm were prepared under the condition at cylinder preset temperature of 250° C. and at mold temperature of 95° C. (the mold surface temperature of 98° C.) using an injection molding machine J-100EPI manufactured by The Japan Steel Works and an injection molding Example 6 and Comparative Example 9

These were carried out in a similar way as Example 2 except that styrene-based resin (A) with a different ratio of the unsaturated nitrile-based monomer was used. Table 2 shows the evaluation results.

TABLE 2

| | (A) Styrene-based resin [parts by mass] | | (B) Aromatic polyester [parts by mass] | (C) Filler [parts by mass] | HDT | Pencil | | Warpage |
|---|---|---|---|---|---|---|---|---|
| | A-4 | A-5 | B-2 | C-1 | [° C.] | hardness | Appearance | [mm] |
| Example 6 | 35 | | 35 | 30 | 155 | 3H | ⊚ | 1 |
| Comparative Example 9 | | 35 | 35 | 30 | 120 | 2H | ⊚ | 1 |

As can be clearly understood from the results of Tables 1 and 2, the thermoplastic resin composition of Examples 1 to 6, which obtained by blending the aromatic polyester in which an isothermal crystallization time from the molten state is from 25 to 100 sec, the styrene-based resin containing an unsaturated nitrile-based monomer in a ratio of from 32 to 50 mass %, and the filler, in a specific ratio, had an excellent balance of heat resistance, appearance, low warpage, and scratch resistance.

On the other hand, resin compositions of Comparative Examples 1 to 9 were out of the scope of the present embodiment on the points of isothermal crystallization time of the aromatic polyester, the ratio of the unsaturated nitrile-based monomer in the styrene-based resin, or the blending amount of each component. Therefore, a resin composition having an excellent balance of heat resistance, appearance, low warpage, and good wound-proof could not be obtained.

INDUSTRIAL APPLICABILITY

Since the thermoplastic resin composition of the present invention has an excellent balance of heat resistance, appearance, low warpage, and good wound-proof, it has an industrial applicability in a wide range of fields such as automobile parts, home appliances and OA, furthermore, can achieve paintless, which was difficult in the conventional technology.

The invention claimed is:

1. A thermoplastic resin composition comprising:
   20 to 60 parts by mass of a styrene-based resin (A) in which a content of an unsaturated nitrile-based monomer is from 32 to 50 mass %;
   20 to 60 parts by mass of an aromatic polyester (B) in which an isothermal crystallization time from a molten state is from 25 to 100 sec; and
   20 to 60 parts by mass of a filler (C); wherein the aromatic polyester (B) is polytrimethylene terephthalate alone, or a polyester mixture comprising 50 mass % or more of polytrimethylene terephthalate.

2. The thermoplastic resin composition according to claim 1, wherein the styrene-based resin (A) is a styrene-acrylonitrile copolymer.

* * * * *